(12) United States Patent
Yuan et al.

(10) Patent No.: US 6,558,767 B2
(45) Date of Patent: May 6, 2003

(54) IMAGEABLE SEAMED BELTS HAVING POLYVINYLBUTYRAL AND ISOCYANATE OUTER LAYER

(75) Inventors: Xiaoying (Elizabeth) Yuan, Fairport, NY (US); Ihor W. Tarnawskyi, Webster, NY (US); Donald S. Stanton, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/886,841

(22) Filed: Jun. 20, 2001

(65) Prior Publication Data

US 2003/0008098 A1 Jan. 9, 2003

(51) Int. Cl.[7] .................................................. B32B 3/00
(52) U.S. Cl. ........................ 428/58; 428/423.1; 474/254
(58) Field of Search ................................ 428/58, 423.1; 474/254

(56) References Cited

U.S. PATENT DOCUMENTS

| 5,525,446 A | 6/1996 | Sypula et al. ................. 430/47 |
| 5,985,419 A | 11/1999 | Schlueter, Jr. et al. ...... 428/195 |
| 6,042,917 A | 3/2000 | Schlueter, Jr. et al. ........ 428/60 |

Primary Examiner—Alexander S. Thomas
(74) Attorney, Agent, or Firm—Annette L. Bade

(57) ABSTRACT

A seamed flexible belt with interlocking seam members having an outer layer including a polyvinylbutyral and an isocyanate, or a polyurethane from the reaction of polyvinylbutyral and an isocyanate, for use in the xerographic, contact electrostatic, digital and other like machines.

20 Claims, 8 Drawing Sheets

IMAGEABLE SEAMED BELTS HAVING POLYVINYLBUTYRAL AND ISOCYANATE OUTER LAYER

CROSS REFERENCE TO RELATED APPLICATIONS

Attention is directed to U.S. Pat. No. 6,318,223, filed Jan. 28, 2000, entitled "Process and Apparatus for Producing an Endless Seamed Belt;" U.S. Pat. No. 6,358,347 filed Dec. 22, 1999, entitled, "Continuous Process for Manufacturing Imageable Seamed Belts for Printers;" U.S. Pat. No. 6,316,070, filed May 28, 1998, entitled, "Unsaturated Carbonate Adhesives for Component Seams;" U.S. Pat. No. 6,379,486, filed Jul. 13, 2000, entitled, "Polyimide Adhesive For Polyimide Component Interlocking Seams;" U.S. patent application Ser. No. 09/615,426, filed Jul. 13, 2000, pending, entitled, "Process For Seaming Interlocking Seams Of Polyimide Component Using Polyimide Adhesive"; U.S. Pat. No. 6,327,454, filed Sep. 13, 2000, entitled, "Imageable Seamed Belts Having Fluoropolymer Adhesive Between Interlocking Seaming Members;" U.S. Pat. No. 6,387,465, filed Sep. 13, 2000, entitled, "Imageable Seamed Belts Having Fluoropolymer Overcoat;" U.S. patent application Ser. No. 09/833,930 filed Apr. 11, 2001, pending, entitled, "Imageable Seamed Belts Having Hot Melt Processable, Thermosetting Resin and Conductive Carbon Filler Adhesive Between Interlocking Seaming Members;" U.S. patent application Ser. No. 09/833,965, filed Apr. 11, 2001, pending, entitled, "Conductive Carbon Filled Polyvinyl Butyral Adhesive;" U.S. patent application Ser. No. 09/833,488, filed Apr. 11, 2001, pending entitled, "Dual Curing Process for Producing A Puzzle Cut Seam;" U.S. patent application Ser. No. 09/833,546 filed Apr. 11, 2001, pending entitled "Imageable Seamed Belts Having Polyamide Adhesive Between Interlocking Seaming Members; and U.S. patent application Ser. No. 09/833,507 filed Apr. 11, 2001, pending, entitled "Polyamide and Conductive Filler Adhesive;" and U.S. patent application Ser. No. 09/833,964 filed Apr. 11, 2001, pending, entitled "Flashless Hot Melt Bonding of Adhesives for Imageable Seamed Belts." The disclosures of each of these references are hereby incorporated by reference in their entirety.

BACKGROUND OF THE INVENTION

The present invention is directed to an endless flexible seamed belt wherein an image can be transferred at the seam of the belt with little or no print defects caused by the seam. In embodiments, the present invention relates to xerographic component imageable seamed belts comprising an adhesive formed between interlocking elements of a seam. In an embodiment, an overcoat, and preferably a polyvinylbutyral and isocyanate overcoat, or a polyurethane overcoat from the reaction of a polyvinylbutyral and isocyanate, is positioned over the imageable seamed belt. The present invention, in embodiments, provides a belt, which has low surface energy and low friction. The present invention further provides, in embodiments, a belt having a seam with increased strength. The present invention, in embodiments, also provides a belt in which an increase in toner transfer efficiency and a decrease or elimination of toner disturbance is possible, due to an improvement in controlled conductivity. The belt, in embodiments, further allows for improved cleaning because of the increased toner transfer efficiency. In embodiments, a cleanerless system is realized. The present invention further provides, in embodiments, a reduced energy consumption due, in part, to a decrease in necessary cure temperature. A broader latitude of seam adhesives can be used with the outer layer, and the outer layer is further inexpensive as an overcoat. The coating, in embodiments, has increased adhesion to substrate materials. The belt, in embodiments, allows for image transfer at the seam, which cannot be accomplished with known seamed belts.

In a typical electrostatographic reproducing apparatus such as an electrophotographic imaging system using a photosensitive member, a light image of an original to be copied is recorded in the form of an electrostatic latent image upon a photosensitive member and the latent image is subsequently rendered visible by the application of a developer mixture. One type of developer used in such printing machines is a liquid developer comprising a liquid carrier having toner particles dispersed therein. Generally, the toner is made up of resin and a suitable colorant such as a dye or pigment. Conventional charge director compounds may also be present. The liquid developer material is brought into contact with the electrostatic latent image and the colored toner particles are deposited thereon in image configuration.

The developed toner image recorded on the imaging member is transferred to an image receiving substrate such as paper via a transfer member. The toner particles may be transferred by heat and/or pressure to a transfer member, or more commonly, the toner image particles may be electrostatically transferred to the transfer member by means of an electrical potential between the imaging member and the transfer member. After the toner has been transferred to the transfer member, it is then transferred to the image receiving substrate, for example by contacting the substrate with the toner image on the transfer member under heat and/or pressure.

Transfer members enable high throughput at modest process speeds. In four-color photocopier or printer systems, the transfer member also improves registration of the final color toner image. In such systems, the four component colors of cyan, yellow, magenta and black may be synchronously developed onto one or more imaging members and transferred in registration onto a transfer member at a transfer station.

In electrostatographic printing and photocopy machines in which the toner image is transferred from the transfer member to the image receiving substrate, it is desired that the transfer of the toner particles from the transfer member to the image receiving substrate be substantially 100 percent. Less than complete transfer to the image receiving substrate results in image degradation and low resolution. Complete transfer is particularly desirable when the imaging process involves generating full color images since undesirable color deterioration in the final colors can occur when the color images are not completely transferred from the transfer member.

Thus, it is desirable that the transfer member surface has excellent release characteristics with respect to the toner particles. Conventional materials known in the art for use as transfer members often possess the strength, conformability and electrical conductivity necessary for use as transfer members, but can suffer from poor toner release characteristics, especially with respect to higher gloss image receiving substrates.

Polyimide substrate transfer members are suitable for high performance applications because of their outstanding mechanical strength and thermal stability, in addition to their good resistance to a wide range of chemicals. However, the high cost of manufacturing unseamed polyimide belts has led to the introduction of a seamed belt. Polyimides with the best mechanical and chemical properties often exhibit poor adhesion at the seam even when commercially available primers are used. Further, polyimide materials exhibit relatively high surface energy and high friction, which decrease toner transfer efficiency in transfix and transfuse applications. In order to have high toner transfer efficiency, higher electric fields are typically required to transfer the toner and various costly cleaning apparatuses are employed to remove residual toner that does not transfer. In addition, present imageable seam belt substrates such as polyimides have high surface resistivity, which reduces the electrical latitude of seam adhesives and causes toner disturbance. Meanwhile, the seam strength of imageable seams can be relatively low due to superfinishing of the seam area. These seams are fragile and may be easily damaged if mishandled.

Therefore, it is desired to provide a belt, which has the desired properties of the polyimide belt, but with low surface energy, low friction, and controlled conductivity. Such a belt will increase toner transfer efficiency, improve cleaning and consequently reduce the energy consumption. Further, it is desired to provide a belt, which has increased strength. Also, it is desirable to provide a belt, which works well with a broader latitude of seam adhesives. Moreover, it is desirable to provide a belt, which is relatively inexpensive. In addition, it is desirable to provide a seam, which is imageable, thereby reducing or eliminating the presence of print or copy defects.

U.S. Pat. No. 5,549,193 relates to an endless flexible seamed belt comprising puzzle cut members, wherein at least one receptacle has a substantial depth in a portion of the belt material at the belt ends.

U.S. Pat. No. 5,721,032 discloses a puzzle cut seamed belt having a strength-enhancing strip.

U.S. Pat. No. 5,487,707 discloses a puzzle cut seamed belt having a bond between adjacent surfaces, wherein an ultraviolet cured adhesive is used to bond the adjacent surfaces.

U.S. Pat. No. 5,514,436 relates to a puzzle cut seamed belt having a mechanically invisible seam, which is substantially equivalent in performance to a seamless belt.

U.S. Pat. No. 5,525,446 describes an intermediate transfer member including a base layer and top thermoplastic film forming polymer layer. The base layer can include a polycarbonate film, and the top layer can include polybutylenes. The belt can comprise an adhesive layer such as a polyvinylbutyral adhesive layer.

SUMMARY OF THE INVENTION

Embodiments of the present invention include: an endless seamed flexible belt comprising a first end and a second end, each of the first end and the second end comprising a plurality of mutually mating elements which join in an interlocking relationship to form a seam, the seam comprising an adhesive, and the belt comprising a substrate and an outer layer comprising a polyurethane derived from a polyvinylbutyral and isocyanate.

In addition, embodiments of the present invention include: an endless seamed flexible belt comprising a first end and a second end, each of the first end and the second end comprising a plurality of mutually mating elements which join in an interlocking relationship to form a seam, the belt comprising a polyimide substrate and an outer layer comprising a polyurethene derived from a polyvinylbutyral crosslinked with a block isocyanate.

Embodiments further include: an image forming apparatus for forming images on a recording medium comprising: a charge-retentive surface to receive an electrostatic latent image thereon; a development component to apply toner to the charge-retentive surface to develop the electrostatic latent image to form a developed image on the charge retentive surface; a transfer belt to transfer the developed image from the charge retentive surface to a copy substrate, wherein the transfer belt is an endless seamed flexible belt comprising a first end and a second end, each of the first end and the second end comprising a plurality of mutually mating elements which join in an interlocking relationship to form a seam, the transfer belt comprising a substrate and an outer layer comprising a polyurethane derived from polyvinylbutyral and isocyanate; and a fixing component to fuse the developed image to the copy substrate.

BRIEF DESCRIPTION OF THE DRAWINGS

For a better understanding of the present invention, reference may be had to the accompanying figures.

DETAILED DESCRIPTION OF THE PRESENT INVENTION

The present invention relates to an endless flexible seamed belt having a puzzle cut seam, wherein the belt comprises an outer layer including polyvinylbutyral and isocyanate. The belt, in embodiments, has low surface energy and low friction. This results in an improvement in cleaning, and possibly, enables a cleanerless system. The overcoat, in embodiments, improves the mechanical strength of the seamed belt by covering up the interlocking members which can sometimes contain fragile petals, and protecting them from the cleaning blade. The added thickness of the overcoat layer, in embodiments, allow for an increase in pull strength and flex life of the seamed area. Also, the belt, in embodiments, provides an increase in toner transfer efficiency and a decrease or elimination of toner disturbance, both due to the improvement in controlled conductivity. The belt, in embodiments, further allows for reduced energy consumption due, in part, to the ability to cure at a relatively low temperature. The low temperature cure is less likely to cause physical distortion of the coatings. The coating, in embodiments, covers the seam with good topography. The belt, in embodiments, allows for image transfer at the seam, which cannot be accomplished with known seamed belts. The conductivity-controlled overcoat, in embodiments, can hide image-distorting imperfections in the substrate material and particularly in the imageable seam area to enable wider latitude of substrate/adhesive choices. By broadening the latitude of substrate and adhesive choices, in embodiments, a lower cost imageable seam can be enabled.

In embodiments, the belt is an intermediate transfer belt, sheet, roller, or film useful in xerographic, including digital, apparatuses. However, the belts herein having an outer layer comprising polyvinylbutyral and isocyanate, can be useful as belts, rollers, drelts (cross between drum and belt), and the like, for many different processes and components such as photoreceptors, fusing members, transfix members, bias transfer members, bias charging members, developer members, image bearing members, conveyor members, cleaning members, and other members for contact electrostatic printing applications, xerographic applications, including digital, and the like. Further, the belts, herein, can be used for both liquid and powder xerographic architectures.

Figure 1:
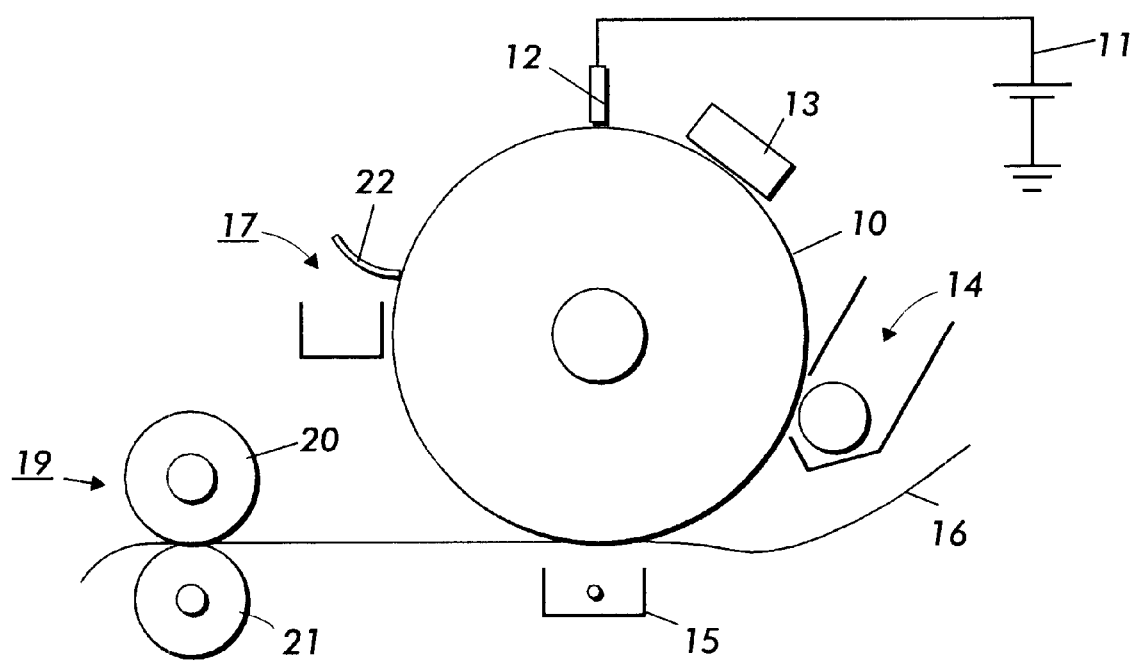
FIG. 1 is a depiction of an electrostatographic apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. Specifically, photoreceptor 10 is charged on its surface by means of a charger 12 to which a voltage has been supplied from power supply 11. The photoreceptor is then image wise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface, in image configuration, they are transferred to a copy sheet 16 by transfer means 15, which can be pressure transfer or electrostatic transfer. Preferably, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 20 and pressure member 21, thereby forming a permanent image. Fusing may be accomplished by other fusing members such as a fusing belt in pressure contact with a pressure roller, fusing roller in contact with a pressure belt, or other like systems. Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus.

Figure 2:
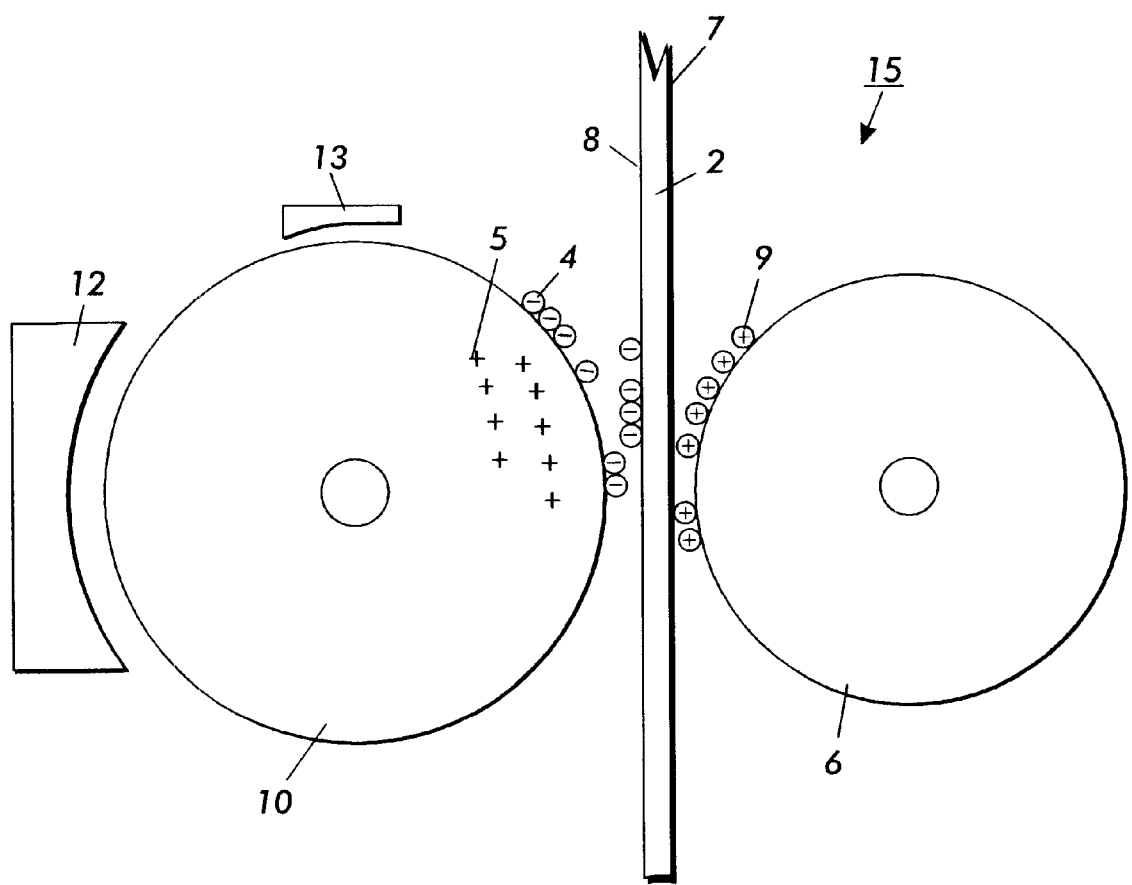
FIG. 2 is an enlargement of a transfer system according to an embodiment of the present invention.

FIG. 2 is a schematic view of an image development system containing an intermediate transfer member. FIG. 2 demonstrates another embodiment of the present invention and depicts a transfer apparatus 15 comprising a transfer member 1 positioned between an imaging member 10 and a transfer roller 6. The imaging member 10 is exemplified by a photoreceptor drum. However, other appropriate imaging members may include other electrostatographic imaging receptors such as ionographic belts and drums, electrophotographic belts, and the like.

In the multi-imaging system of FIG. 2, each image being transferred is formed on the imaging drum by image forming station 12. Each of these images is then developed at developing station 13 and transferred to transfer member 2. Each of the images may be formed on the photoreceptor drum 10 and developed sequentially and then transferred to the transfer member 2. In an alternative method, each image may be formed on the photoreceptor drum 10, developed, and transferred in registration to the transfer member 2. In a preferred embodiment of the invention, the multi-image system is a color copying system. In this color copying system, each color of an image being copied is formed on the photoreceptor drum. Each color image is developed and transferred to the transfer member 2. As above, each of the colored images may be formed on the drum 10 and developed sequentially and then transferred to the transfer member 2. In the alternative method, each color of an image may be formed on the photoreceptor drum 10, developed, and transferred in registration to the transfer member 2.

After latent image forming station 12 has formed the latent image on the photoreceptor drum 10 and the latent image of the photoreceptor has been developed at developing station 13, the charged toner particles 4 from the developing station 13 are attracted and held by the photoreceptor drum 10 because the photoreceptor drum 10 possesses a charge 5 opposite to that of the toner particles 4. In FIG. 2, the toner particles are shown as negatively charged and the photoreceptor drum 10 is shown as positively charged. These charges can be reversed, depending on the nature of the toner and the machinery being used. In a preferred embodiment, the toner is present in a liquid developer. However, the present invention, in embodiments, is useful for dry development systems also.

A biased transfer roller 6 positioned opposite the photoreceptor drum 10 has a higher voltage than the surface of the photoreceptor drum 10. As shown in FIG. 2, biased transfer roller 6 charges the backside 7 of transfer member 2 with a positive charge. In an alternative embodiment of the invention, a corona or any other charging mechanism may be used to charge the backside 7 of the transfer member 2.

The negatively charged toner particles 4 are attracted to the front side 8 of the transfer member 2 by the positive charge 9 on the backside 7 of the transfer member 2.

Figure 3:
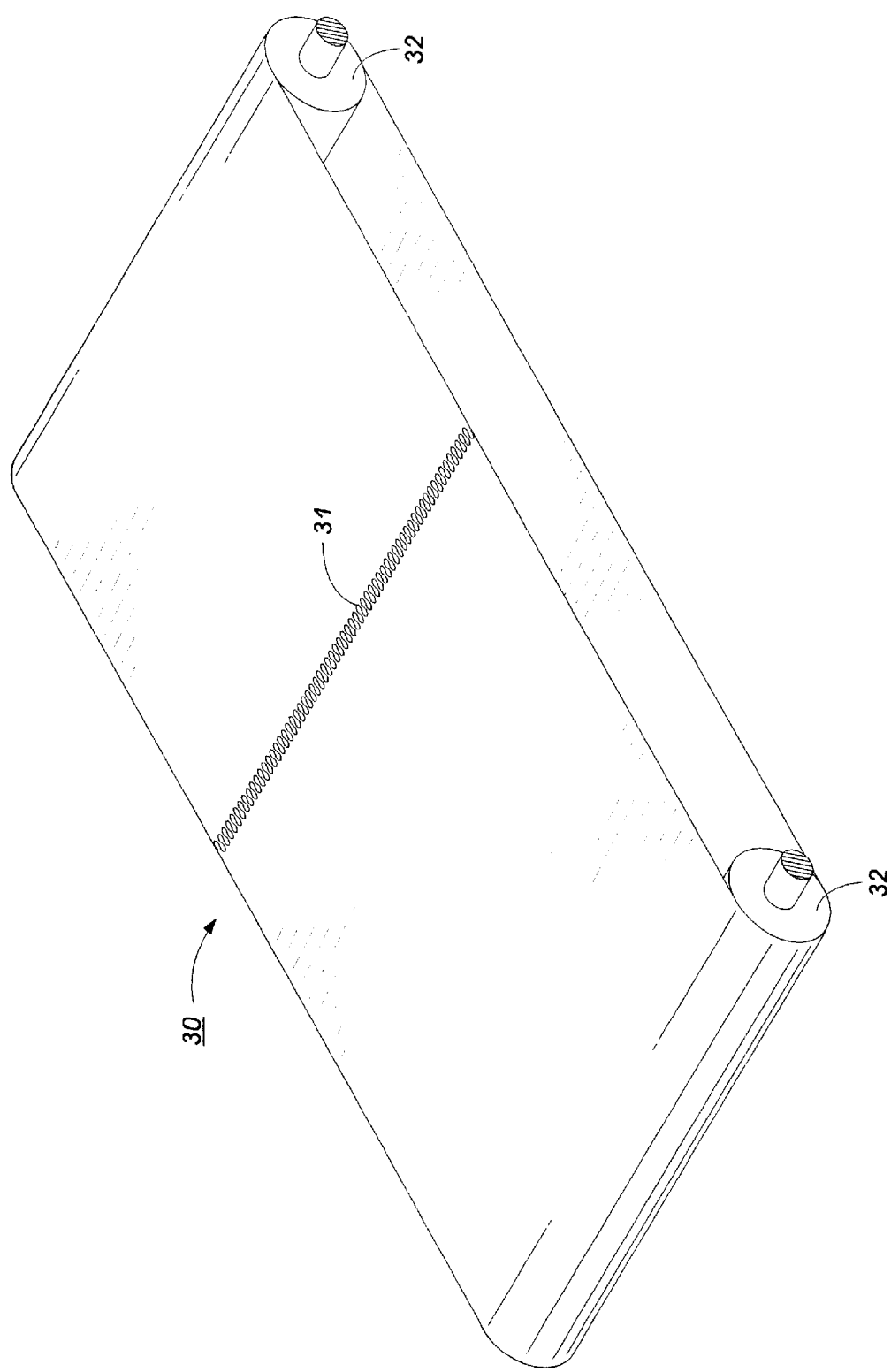
FIG. 3 is an enhanced view of an embodiment of a belt configuration and seam according to the present invention.

FIG. 3 demonstrates an example of an embodiment of a belt in accordance with the present invention. Belt 30 is demonstrated with seam 31. Seam 31 is pictured as an example of one embodiment of a puzzle cut seam. The belt is held in position and turned by use of rollers 32. Note that the mechanical interlocking relationship of the seam 31 is present in a two-dimensional plane when the belt 30 is on a flat surface, whether it be horizontal or vertical. While the seam is illustrated in FIG. 3 as being perpendicular to the two parallel sides of the belt, it should be understood that it may be angled or slanted with respect to the parallel sides. This enables any noise generated in the system to be distributed more uniformly and the forces placed on each mating element or node to be reduced.

The seam formed according to the present invention is one having a thin and smooth profile, of enhanced strength, improved flexibility and extended mechanical life. In an embodiment, the belt ends can be held together by the geometric relationship between the ends of the belt material, which are fastened together by a puzzle cut. Alternatively, overlapping, interlocking seam members can be present. The puzzle cut seam can be of many different configurations, but is one in which the two ends of the seam interlock with one another in a manner of a puzzle. Specifically, in embodiments, the mutually mating elements comprise a first projection and a second receptacle geometrically oriented so that the second receptacle on the first end receives the first projection on the second end and wherein the first projection on the first end is received by the second receptacle on the second end. The seam has a kerf, void or crevice between the mutually mating elements at the two joining ends of the belt, and that crevice can be filled with an adhesive according to the present invention. The opposite surfaces of the puzzle cut pattern are bound or joined together to enable the seamed flexible belt to essentially function as an endless belt. The belt, in embodiments, provides improved seam quality and smoothness with substantially no thickness differential between the seam and the adjacent portions of the belt.

Figure 4:
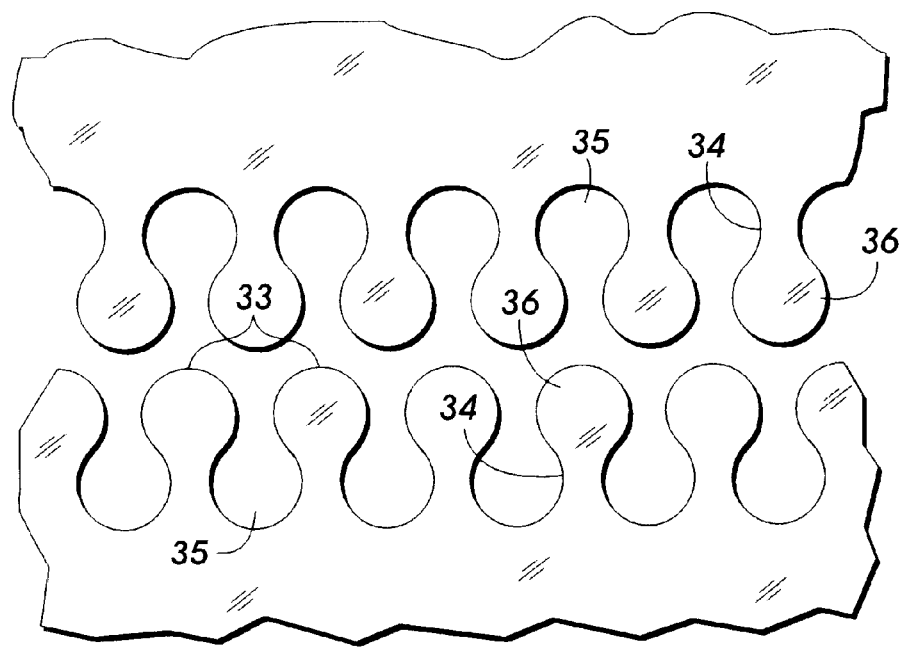
FIG. 4 is an enlargement of a puzzle cut seam having head and neck members according to one embodiment of the present invention.
Figure 5:
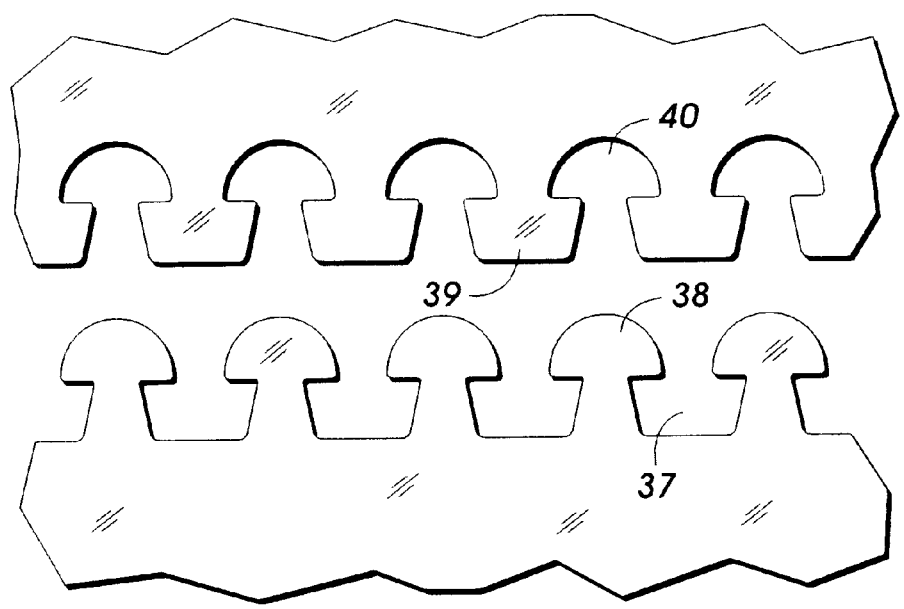
FIG. 5 is an enlargement of a puzzle cut seam having mushroom-shaped shaped puzzle cut members according to another embodiment of the present invention.
Figure 6:
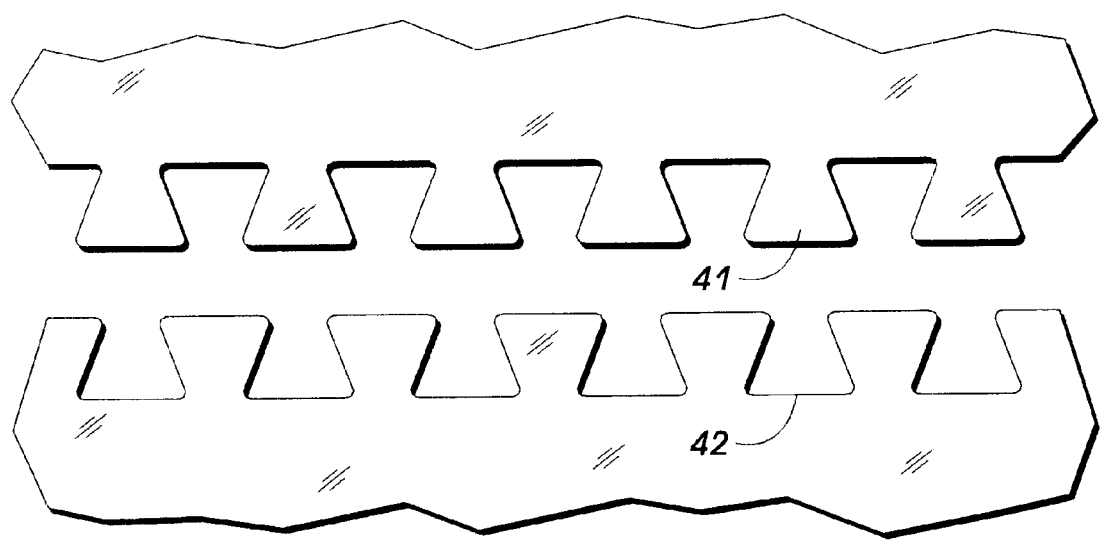
FIG. 6 is an enlargement of a puzzle cut seam having dovetail members according to another embodiment of the present invention.
Figure 7:
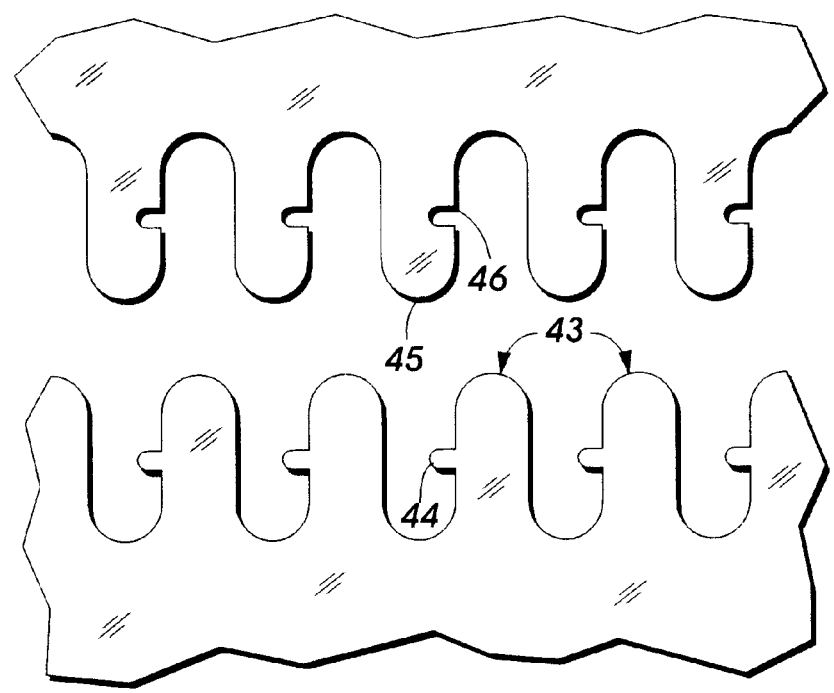
FIG. 7 is an enlargement of a puzzle cut seam having recessor and teeth members according to another embodiment of the present invention.

An example of an embodiment of a puzzle cut seam having two ends, each of the ends comprising puzzle cut members or mutually mating elements is shown in FIG. 4. The puzzle cut pattern may take virtually any form, including that of nodes such as identical post or neck 34 and head 33 or node patterns having projections 36 and receptacles 35 which interlock when brought together as illustrated in FIG. 4. The puzzle cut pattern may also be of a more mushroom-like shaped pattern having first projections 38 and 39 and second receptacles 40 and 37 as illustrated in FIG. 5, as well as a dovetail pattern as illustrated in FIG. 5 having first projections 41 and second receptacles 42. The puzzle cut pattern illustrated in FIG. 7 has a plurality of first fingers 43 with interlocking teeth 44 and plurality of second fingers 45 which have recesses 46 to interlock with the teeth 44 when assembled. It is preferred that the interlocking elements all have curved mating elements to reduce the stress concentration between the interlocking elements and permit them to separate when traveling around curved members such as the rolls 32 of FIG. 3. It has been found that with curved mating elements that the stress concentration is lower than with square corners where rather than the stress being uniformly distributed it is concentrated leading to possible failure.

Figure 8:
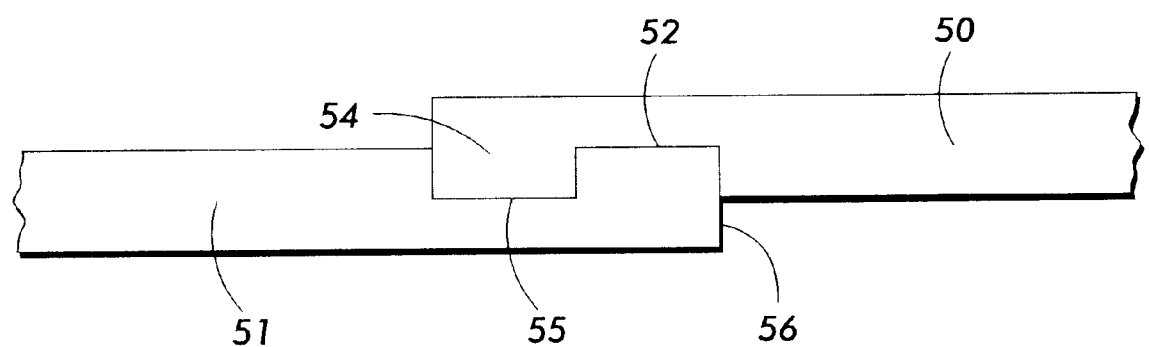
FIG. 8 is an enlargement of a puzzle cut seam having receptacle and projection members of differing depth according to another embodiment of the present invention.

Another example of a puzzle cut seam is shown in FIG. 8 in which the mutually mating elements or puzzle cut members comprise a first member 50 and a second member 51, wherein the first member 50 comprises a first receptacle 52 and a first projection 54, and the second member 51 comprises a second receptacle 55 and a second projection 56. The first receptacle 52 of the first member 50 receives the second projection 56 of the second member 51, and the second receptacle 55 of the second member 51 receives the first projection 54 of the first member 50. In order to reduce the height differential between the seamed portion and the adjacent, unseamed portion of the belt, it is desirable to have the second receptacles formed within their individual members at a substantial depth in a portion of the belt as the belt ends.

In embodiments, the height differential between the seam and the rest of the belt (the nonseamed portions of the belt) is practically nil, or from about 0 to about 25 micrometers, preferably from about 0.0001 to about 25 micrometers, and particularly preferred of from about 0.01 to about 5 micrometers. It is also preferred that any height difference between the seam and substrate be tapered and not abrupt.

The outer layer comprises polyvinylbutyral and an isocyanate, or polyurethane prepared by the reaction of polyvinylbutyral and an isocyanate. Examples of polyvinylbutyrals include a copolymer, which contains polyvinyl alcohol, acetate and a butyral segment. Commercially available examples of polyvinylbuyral include BUTVAR® B90, B76, B79 and B98 from Solutia.

In embodiments, the polyvinylbutyral can be blended with other polymers. Examples of suitable polymers to be blended with polyvinylbutyral include phenolic, melamine, rosin derivatives, polyester, acrylic, isocyanates, alkyd, PTFE (polytetrafluoroethylene) powder, silicone, functional siloxane, fluorocarbons, and the like. In embodiments wherein the polymer is an isocyanate, the isocyanate can be a block isocyanate. In embodiments, the isocyanate can be selected from the group consisting of aliphatic and aromatic based isocyanates or their prepolymers. Commercially available isocyanates include block isocyanate BL3175 and BL 4265 from Bayer.

In optional embodiments, the outer layer can further comprise other curative polymers such as phenolic polymers, epoxies, dialdehydes and melamines, and the like, and mixtures thereof.

A surface resistivity range for toner transfer performance can be from about $10^2$ to about $10^{15}$ ohm/sq, or from about $10^6$ to about $10^{14}$ ohm/sq. A volume resistivity for toner transfer performance can be from about $10^8$ to about $10^{11}$ ohm-cm. When the belt and the seam of the belt have the same or substantially the same electrical resistance, toner transfer at the seam is the same or substantially the same as the transfer at the belt. Such transfer at the seam provides an invisible or substantially invisible seam.

The overcoated belt has excellent properties including low surface energy, mechanical strength, desired resistivity and thermal stability. The belt has a sliding coefficient against paper of from about 0.1 to about 0.4, or from about 0.18 to about 0.28. If the overcoat comprises fillers, the coefficient of friction is from about 0.3 to about 0.4, and an unfilled coating will have a coefficient of friction of from about 0.18 to about 0.28. The coefficient of friction against paper for an un-coated polyimide (KAPTON®) film, can be from about 0.3 to about 0.5.

The coated belt has a decrease surface energy. For example, the coated belt has a surface energy of from about 10 to about 40, or from about 20 to about 30, or 24 dyn/cm. The coating without fillers can have a surface energy of about 24 dyn/cm. The surface energy of un-coated polyimide (KAPTON®) film is about 43 dyn/cm.

The electrical properties of the belt seam, or layers of the belt, can be controlled by varying the amount of fillers, by changing the type of filler added, and/or by changing the curing procedure.

Fillers can be added to the substrate and/or to the adhesive and/or to the outer layer so as to impart desired electrical resistivity. Examples of suitable fillers for use in the substrate, adhesive and/or outer layer include carbon fillers, metal oxide fillers, doped metal oxide fillers, other metal fillers, polymer fillers, other conductive fillers, and the like. Specific examples of fillers include carbon fillers such as carbon black, fluorinated carbon black, graphite, low conductive carbon, and the like, and mixtures thereof; metal oxides such as indium tin oxide, zinc oxide, iron oxide, aluminum oxide, copper oxide, lead oxide, and the like, and mixtures thereof; doped metal oxides such as antimony-doped tin oxide, antimony-doped titanium dioxide, aluminum-doped zinc oxide, similar doped metal oxides, and mixtures thereof; polymer fillers such as polyaniline, polythiophenes [for example, polythiophene sulfone (BAYTRON®)], polypyrrole, polydimethylsiloxane, polytetrafluoroethylene, and the like, and mixtures thereof; ionic conductors such as alkali alkyl sulfonates, quaternary ammonium salts, phosphonium salts, doped polyaniline, and the like, and mixtures thereof; Examples of commercially available fillers include fluorinated carbon (such as ACCU-FLUOR® from Allied Signal of Morristown, N.J.), ZELEC® (antimony doped tin oxide) available from DuPont, Wilmington, Del., BAYTRON® P and BAYTRON® M (polymer which contain polyethylendioxythiophene), BAYTRON® being a trademark of Bayer Corporation, Pittsburgh, Pa.

One type of fluorinated carbon includes those having the formula $CF_x$ with x representing the number of fluorine atoms and generally being up to about 1.5, preferably from about 0.01 to about 1.5, and particularly preferred from about 0.04 to about 1.4. Other preferred fluorinated carbons are poly(dicarbon monofluoride) which is usually written in the shorthand manner $(C_2F)_n$. Preferred fluorinated carbons selected include those described in U.S. Pat. No. 4,524,119 to Luly et al., the subject matter of which is hereby incorporated by reference in its entirety, and those having the tradename ACCUFLUOR®, (ACCUFLUOR® is a registered trademark of Allied Signal, Morristown, N.J.) for example, ACCUFLUOR® 2028, ACCUFLUOR® 2065, ACCUFLUOR® 1000, and ACCUFLUOR® 2010. ACCUFLUOR® 2028 and ACCUFLUOR® 2010 have 28 and 11 percent by weight fluorine, respectively, based on the weight of fluorinated carbon. ACCUFLUOR® 1000 and ACCUFLUOR® 2065 have 62 and 65 percent by weight fluorine, respectively, based on the weight of fluorinated carbon. Also, ACCUFLUOR® 1000 comprises carbon coke, whereas ACCUFLUOR® 2065, 2028 and 2010 all comprise conductive carbon black. These fluorinated carbons are of the formula $CF_x$ and are formed by the reaction of $C+F_2=CF_x$.

The filler, if present in the substrate, can be present in an amount of from about 1 to about 60, or from about 3 to about 40 percent by weight of total solids. Total solids, as used herein, refers to the amount of solids present in the substrate, layer, or adhesive. The filler, if present in the adhesive, can be present in an amount of from about 2 to about 60, or from about 5 to about 30 percent by weight of total solids. The filler, if present in the outer layer, can be present in an amount of from about 6 to about 10 percent by weight of total solids.

Figure 10:
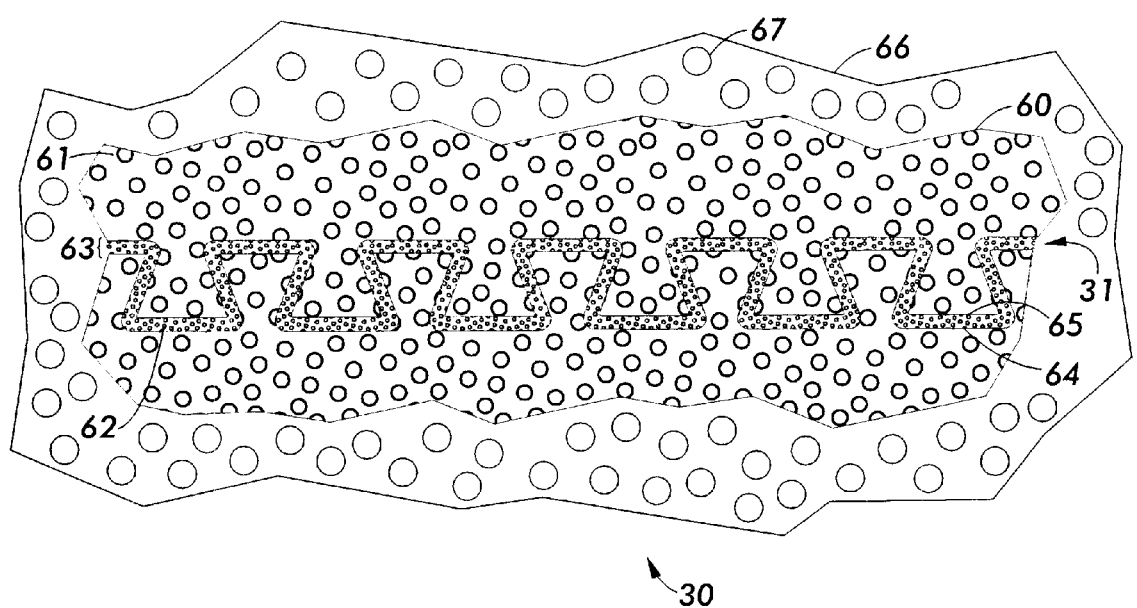
FIG. 10 is an enlarged overhead view of a belt according to an embodiment of the invention.

An example of a preferred belt used is depicted in FIG. 10. The belt 30 comprises a substrate 60, having therein, in embodiments, conductive fillers 61. The belt contains seam 31 having an adhesive 63 positioned between the seam members 64 and 65. In an embodiment, conductive fillers 62 are dispersed or contained in the adhesive. In an embodiment of the invention, the polyvinylbutyral and isocyanate, or the polyurethane from the reaction of polyvinylbutyral and isocyanate, overcoat 66 is provided over the substrate 60. The overcoat may contain conductive fillers 67. Conductive fillers 61 optionally dispersed or contained in the substrate, fillers 67 optionally dispersed or contained in the overcoat, and fillers 62 optionally contained or dispersed in the adhesive, may be the same or different.

Examples of suitable substrate materials include semiconductive polyimides such as polyaniline-filled polyimide, carbon-filled polyimides, antimony doped tin oxide-filled polyimide, carbon-filled polycarbonate, and the like. Examples of commercially available polyimide substrates include KAPTON® and UPLIEX® both from DuPont, and ULTEM® from GE.

Figure 9:
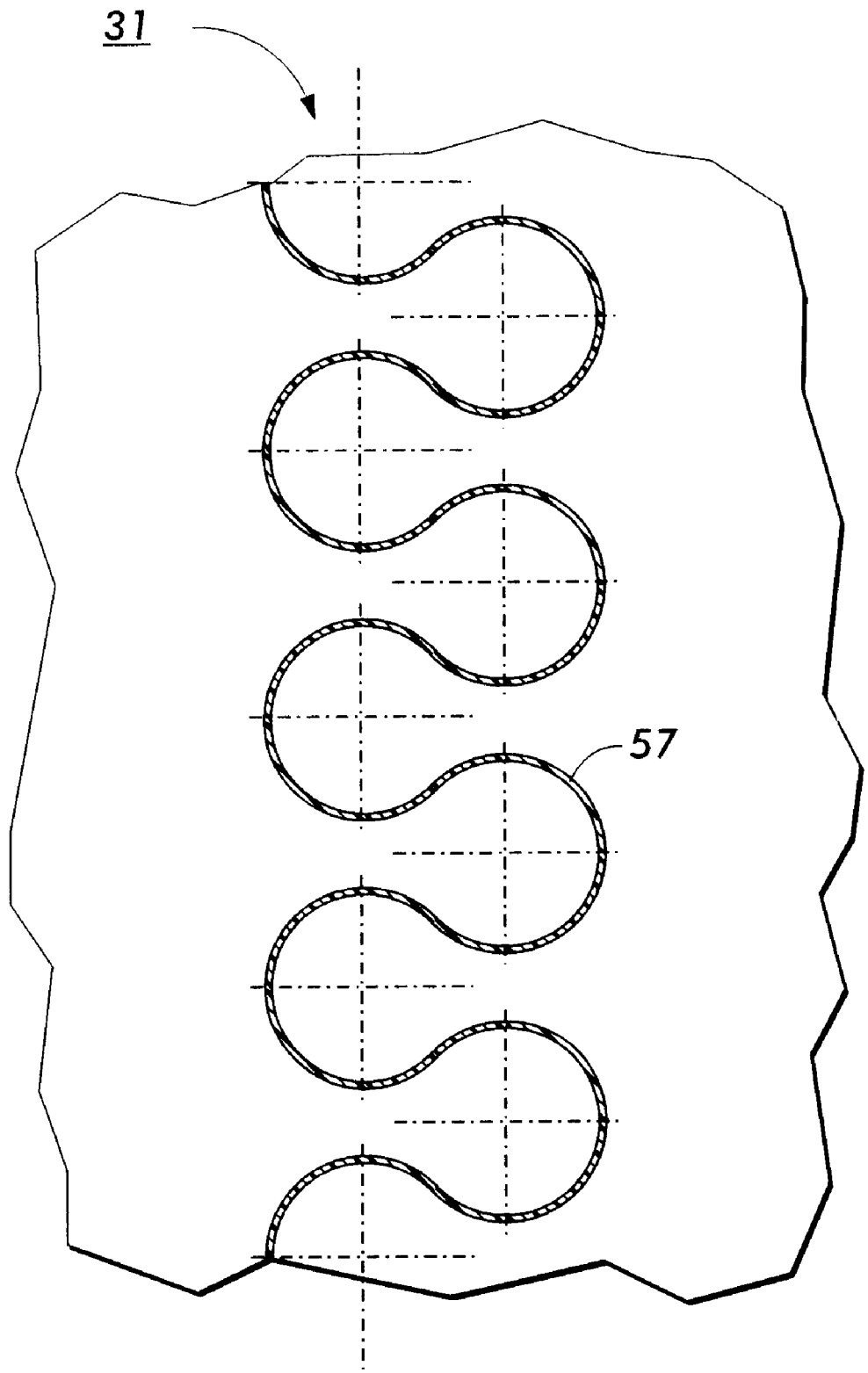
FIG. 9 is an enlarged version of a belt according to one embodiment of the present invention and demonstrates a crevice between the puzzle cut members, the crevice containing an adhesive.

An adhesive is preferably present between the seam, and placed in the crevice between the puzzle cut members to a thickness of from about 0.0001 to about 50 micrometers. As shown in one embodiment of a puzzle cut seam 31 according to the present invention, the adhesive is present between the puzzle cut members and at the seam crevice 57 of FIG. 9.

Because of the chemistry of the outer layer of the belt, a variety of adhesives can be used. The outer layer is compatible with many types of adhesives. Examples of suitable adhesives include fluoropolymer adhesives such as fluorinated urethanes (for example, fluoroethylene vinyl ether based polyurethanes, fluorinated epoxy polyurethane, fluorinated acrylic polyurethanes, and the like, and polymers thereof and mixtures thereof); polyvinylbutyral adhesives, epoxy adhesives, polyimide adhesives, polyurethane adhesives, polyamide adhesives such as DHTBD filled LUCKAMIDE® and other high temperature adhesives such as polyaniline filled polyimide, nitrile phenolic, and the like.

The belt may be prepared by adding an adhesive solution between the substrate interlocking members by any suitable means such as using a cotton tipped applicator, liquid dispenser, glue gun and other known means. The adhesive is placed between seaming members and the seaming members are brought together and bonded using known methods, and other methods such as that described in copending U.S. patent application Ser. No. 09/833,964 filed Apr. 11, 2001, pending, entitled, "Flashless Hot Melt Bonding of Adhesives for Imageable Seamed Belts." The disclosure of this reference is hereby incorporated by reference herein in its entirety.

The outer layer is prepared by mixing the polyvinylbutyral with the isocyanate in the presence of a catalyst. Examples of suitable catalysts include tin catalyst, for example, dibutyl tin dilaurate (DBTDL). The solution is mixed for example, on a roll mill, and then coated on the substrate.

The outer layer may then be applied to the seamed substrate using a variety of common coating processes such as roll coating, gap coating, spray coating, dip coating, flow coating, and the like.

The outer layer is allowed to dry and then is postcured. The thermal curing induces the crosslinking reaction of the polyvinylbutyral and isocyanate, and also activates the controlled conductivity mechanism in the layers. Polyurethane is thereby formed. Curing procedures useful in curing the outer layer include thermal curing and infrared curing. Examples of heat curing include use of moderate heat once the adhesive is placed in the seam crevice. This moderate heating also increases the crosslinking/solidification reaction and increases the seam processing and belt fabrication speed. The relatively low temperature postcure is less likely to cause physical distortion of the seam and should cover the seam with good topography. Desired temperature includes from about 40 to about 200° C., preferably from about 120 to about 150° C., at a time of from about 30 seconds to about 24 hours, or from about 15 minutes to about 3 hours, or from about 30 minutes to about 1 hour. Heat may be applied by, for example, a heat gun, oven, or other suitable means.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example 1
Preparation of Intermediate Transfer Belt

A polyimide film substrate was obtained from DuPont. The belt substrate was comprised of polyaniline and carbon-filled polyimide. The resistivity was tested and found to be from about $10^{12}$ to about $10^{13}$ ohm-cm. The belt ends that were to be joined were treated with a primer shortly before assembly, to help improve adhesion. The puzzle cut ends were wiped with a 10% solution of 3-aminopropyltriethoxysilane (Aldrich) in toluene, and allowed to dry for about 10 minutes at 40° C.

Optionally, the belt ends to be joined can be subjected to a "chemical etch" treatment to help improve adhesion. The puzzle cut ends can be dipped in 1N aqueous NaOH solution for about 10 minutes, followed by 10 minutes in 1N aqueous HCl solution. The ends can then be rinsed with distilled water and allowed to dry.

Example 2
Preparation of LUCKAMIDE® (Polyamide) and DHTBD Adhesive

An amount of about 100 grams LUCKAMIDE® was added to a mixture of 150 grams methanol and 150 grams 1-propanol in a 1000-ml bottle. The bottle was warmed to about 60° C. until the resin completely dissolved. To the warm LUCKAMIDE® solution was added 60 grams DHTBD and the solution was mixed well until all the solid dissolved. To this solution was then added 4.2 grams of oxalic acid dissolved in a minimal amount of methanol and also 14 grams of BLACK PEARLS® 2000 (carbon black) dispersion. The mixture was placed on a roll mill for about 1 hour to ensure complete mixing.

The resulting dispersion was drawcoated onto a sheet of TEDLAR®. A suitable sized coating bar was used. The coating was allowed to dry in a drying oven set at about 40° C. for about 3 hours. Once the film was dry, it was kept on the release liner and was ready for use as a seam adhesive. The prepared adhesive tape was stored at below 0° C. to maintain shelf life.

The stock dispersion of carbon black was prepared earlier by attriting 10 grams of BLACK PEARLS® 2000 along with 10 grams LUCKAMIDE® dispersed in 150 grams 1-propanol for about 3 hours, using a bench top attritor charged with 3/16" stainless steel shot media. The slurry was filtered through a course screen to separate out the media and the carbon dispersion was collected in an 8 ounce polyethylene bottle.

Example 3
Preparation of Puzzle Cut Seamed Belt

The two puzzle cut ends of the polyimide film prepared in Example 1 were brought together and aligned on the lower jaw of a Technoseal Vertrod Thermal Impulse Heat Sealer (Mod. 20EP/P-1/4-WC-CAN-DIG-l) with the assistance of vacuum holdown tables mounted on both sides of a welder. A freestanding film of the adhesives/release layer (preferably about 8 to about 80 microns thick) formed in accordance with any of the examples above were selected. A narrow strip (about 1 to about 4 cm wide) of material was cut to a length and width sufficient to adequately cover the puzzle-cut seam area on the belt substrate. The strip of adhesive/release layer was laid across the top of the seam area covering the seam. The welder was set to a nominal impulse temperature of about 120° C., equivalent to the crosslinking temperature of the LUCKAMIDE®. The seam was welded with applied temperature and pressure for about 10 minutes to compression mold the adhesive into the seam kerf, filling it completely. This also initiated crosslinking of the adhesive. Post curing at 120° C. for an additional 30 minutes was required to further crosslink and improve the mechanical properties of the adhesive.

Other methods of hot melt adhesive bonding can be used as well. For example, a heated roll or heated shoe that can move along the seam can be used.

The seamed belt was removed from the fixture, post cured, and the seam was subjected to finishing (sanding) and polishing steps to remove excess adhesive and bring the seam area topography in line with the rest of the belt.

Example 4
Preparation of Non-Filled Polyvinylbutyral and Isocyanate Coating Solution An amount of 4.6 grams BUTVAR® 79 was dissolved in 15.4 grams solvent (a 2:1 mixture of methyl ethyl ketone and ethyl acetate) in a 50-ml bottle. To this solution was added 13.4 grams BL3175 and 0.07 grams FASCAT® 4200. The solution was mixed on a roll mill for about 30 minutes. The completed solution was then coated on the polyimide substrate prepared in accordance with Example 1. The belt was cured in a forced air oven at 150° C. for about 30 minutes.

Example 5
Preparation of Filled Polyvinylbutyral and Isocyanate Outer Layer

An amount of about 0.066 grams (1 pph) of fluorinated carbon (ACCUFLUOR® 2010 from Allied Chemical) (Sample 1) and 0.198 grams (3 pph) of fluorinated carbon (ACCUFLUOR® 2028 from Allied Chemical) (Sample 2) was each separately suspended in about 5 grams methyl ethyl ketone in a 50 ml bottle. The mixtures were each agitated in an ultrasonic bath for about 15 minutes to disperse the carbon particles. To the dispersions were added 0.26 grams (4 pph) DIAK 3 (from Dupont) and mixed well. Subsequently, about 15 grams of polyvinylbutyral/urethane solution prepared in Example 4 were added separately to each sample. The resulting solutions were mixed on a roll mill for about 1 hour. The resultant dispersions were each drawcoated onto the polyimide substrate formed in Example 1.

The coatings were allowed to dry well and then were postcured in an oven for about 30 minutes at 150° C. The thermal treatment served two functions. First, it induced the crosslinking reaction and second, it also activated the controlled conductivity mechanism in the layers.

Example 6
Testing of the Filled Polyvinylbutyral and Isocyanate Outer Layer

Several samples of filled polyvinylbutyral and isocyanate layers prepared in accordance with Example 3 were subjected to testing of resistivity. The filler loadings were varied in the different samples. The resistivity of the samples had been tested by an in-house surface resistive meter and Trek PO661 resistive test fixture (from Trek Inc.). Table 1 below shows the results of the testing.

TABLE 1

| Sample Number | Accufluor ® 2010 | Accufluor ® 2028 | Resistivity |
| --- | --- | --- | --- |
| 1 | 1.0 | 3.0 | $1.6 \times 10^{13}$ |
| 2 | 1.5 | 3.0 | $7.8 \times 10^{11}$ |
| 3 | 2.0 | 3.0 | $1.6 \times 10^{11}$ |

TABLE 1-continued

| Sample Number | Accufluor ® 2010 | Accufluor ® 2028 | Resistivity |
|---|---|---|---|
| 4 | 2.5 | 3.0 | $6.8 \times 10^{10}$ |
| 5 | 3.0 | 3.0 | $6.9 \times 10^{9}$ |

The outer layer was shown to have excellent adhesion to the substrate based on the crosshatch adhesion test. The surfaces of the outer layers demonstrated a low coefficient of friction (COF) and low surface energy. The COF to paper and KAPTON® (polyimide) was in the range of from about 0.18 to about 0.28, and the surface energy was about 24 dyn/cm. Toner transfer efficiency was about 99% better than polyimide, which showed 97% toner transfer. The surface conductivity of the outer layer can be tuned to from about $10^6$ to about $10^{14}$ ohm/cm by changing the conductive filler loading. The pull force of the overcoated seamed belt increased to from 10 to about 30% from a 15 to 20 lb/inch range, to from about 25 to about 30 lb/inch range.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. An endless seamed flexible belt comprising a first end and a second end, each of said first end and said second end comprising a plurality of mutually mating elements which join in an interlocking relationship to form a seam, said seam comprising an adhesive, and said belt comprising a substrate and an outer layer comprising a polyurethane derived from a polyvinylbutyral and isocyanate.

2. An endless seamed flexible belt in accordance with claim 1, wherein said substrate comprises a polyimide.

3. An endless seamed flexible belt in accordance with claim 1, wherein said outer layer further comprises a fluorocarbon.

4. An endless seamed flexible belt in accordance with claim 1, wherein said isocyanate is a block isocyanate.

5. An endless seamed flexible belt in accordance with claim 1, wherein said outer layer comprises an electrically conductive filler.

6. An endless seamed flexible belt in accordance with claim 5, wherein said electrically conductive filler is selected from the group consisting of carbon filler, metal filler, metal oxide filler, doped metal oxide filler, ionic conductive filler, polymer fillers, and mixtures thereof.

7. An endless seamed flexible belt in accordance with claim 6, wherein said carbon filler is selected from the group consisting of carbon, graphite, fluorinated carbon, and mixtures thereof.

8. An endless seamed flexible belt in accordance with claim 6, wherein said doped metal oxide is antimony doped tin oxide.

9. An endless seamed flexible belt in accordance with claim 6, wherein said ionic conductor is selected from the group consisting of alkali alkyl sulfonates, quaternary ammonium salts, phosphonium salts, and mixtures thereof.

10. An endless seamed flexible belt in accordance with claim 6, wherein said polymer filler is selected from the group consisting of polyanilines, polythiophenes, polypyrrolles, and mixtures thereof.

11. An endless seamed flexible belt in accordance with claim 6, wherein said conductive filler comprises doped polyaniline, antimony doped tin oxide and carbon black.

12. An endless seamed flexible belt in accordance with claim 1, wherein said adhesive comprises a material selected from the group consisting of polyvinyl butyral, nitrile phenolic, epoxy, polyimide, polyurethane, polyamide, and mixtures thereof.

13. An endless seamed flexible belt in accordance with claim 1, wherein said surface energy of said outer layer is from about 10 to about 40 dyn/cm to water.

14. An endless seamed flexible belt in accordance with claim 1, wherein said outer layer has a sliding coefficient of from about 0.1 to about 0.4.

15. An endless seamed flexible belt in accordance with claim 1, wherein said belt has a surface resistivity of from about $10^2$ to about $10^{15}$ ohm/sq.

16. An endless seamed flexible belt in accordance with claim 1, wherein said belt has a surface resistivity of from about $10^6$ to about $10^{14}$ ohm/sq.

17. An endless seamed flexible belt in accordance with claim 1, wherein said belt is an intermediate transfer belt.

18. An endless seamed flexible belt in accordance with claim 1, wherein said plurality of mutually mating elements are in the form of a puzzle cut pattern.

19. An endless seamed flexible belt in accordance with claim 18, wherein said mutually mating elements comprise a first projection and a second receptacle geometrically oriented so that said second receptacle on the first end receives the first projection on the second end and wherein said first projection on said first end is received by said second receptacle on the second end to form a joint between the first and second ends.

20. An endless seamed flexible belt comprising a first end and a second end, each of said first end and said second end comprising a plurality of mutually mating elements which join in an interlocking relationship to form a seam, said belt comprising a polyimide substrate and an outer layer comprising a polyurethane derived from a polyvinylbutyral crosslinked with a block isocyanate.

* * * * *